United States Patent
Zeidner et al.

(10) Patent No.: US 10,583,988 B1
(45) Date of Patent: Mar. 10, 2020

(54) AIRCRAFT CARGO HANDLING SYSTEM WITH SELF-ORGANIZING FLEXIBLY POSITIONED POWER DRIVE UNITS

(71) Applicant: GOODRICH CORPORATION, Charlotte, NC (US)

(72) Inventors: Lawrence E. Zeidner, West Hartford, CT (US); Kunal Srivastava, Newington, CT (US); Thomas A. Frewen, West Hartford, CT (US)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 16/167,077

(22) Filed: Oct. 22, 2018

(51) Int. Cl.
   *B65G 13/06* (2006.01)
   *B64D 9/00* (2006.01)

(52) U.S. Cl.
   CPC ............ *B65G 13/065* (2013.01); *B64D 9/00* (2013.01); *B64D 2009/006* (2013.01); *B65G 2201/0267* (2013.01)

(58) Field of Classification Search
   CPC .... B64D 9/00; B64D 2009/006; B65G 67/20; B64F 1/32; B64C 1/20
   USPC ................. 244/118.1; 198/788; 414/812
   See application file for complete search history.

(56) References Cited

U.S. PATENT DOCUMENTS

| | | | |
|---|---|---|---|
| 3,677,192 A * | 7/1972 | Bateson | B60P 3/071 410/5 |
| 5,896,238 A * | 4/1999 | Hubscher | B60R 1/07 310/71 |
| 6,802,412 B2 * | 10/2004 | Lapeyre | B65G 47/844 198/370.02 |
| 7,673,738 B2 | 3/2010 | McConnell | |
| 9,096,317 B2 * | 8/2015 | Huber | B64D 9/00 |
| 9,452,901 B2 * | 9/2016 | Panzram | B65G 67/00 |
| 9,511,934 B2 | 12/2016 | Wurman et al. | |
| 2016/0117536 A1 | 4/2016 | Johnsen | |
| 2018/0056848 A1 | 3/2018 | Koehler | |

* cited by examiner

*Primary Examiner* — Gene O Crawford
*Assistant Examiner* — Lester Rushin, III
(74) *Attorney, Agent, or Firm* — Snell & Wilmer L.L.P.

(57) ABSTRACT

The present disclosure provides a flexibly positioned power drive unit ("PDU) system. The flexibly positioned PDU system may comprise a flexibly positioned PDU comprising a PDU hinged portion and a track coupled to the flexibly positioned PDU, wherein the flexibly positioned PDU is configured to move along a cargo deck and the PDU hinged portion is configured to move a cargo unit from a first location to a second location via the track.

18 Claims, 5 Drawing Sheets

AIRCRAFT CARGO HANDLING SYSTEM WITH SELF-ORGANIZING FLEXIBLY POSITIONED POWER DRIVE UNITS

FIELD OF THE DISCLOSURE

The present disclosure relates to cargo handling systems, and more particularly, to aircraft cargo handling systems.

BACKGROUND OF THE DISCLOSURE

In conventional air cargo handling systems, the cargo units, otherwise known as unit load devices or "ULDs," may be placed in an aircraft cargo bay and stored for flight. Typically, the ULDs may be moved along a cargo bay floor of the cargo bay by a number of electromechanical actuators embedded in the cargo bay floor. These electromechanical actuators may be positioned in fixed locations along the cargo bay floor. Accordingly, present systems may be unable to function properly in response to a failure of one or more of the electromechanical actuators and may require a large number of electromechanical actuators, thereby increasing a weight of the aircraft.

SUMMARY OF THE DISCLOSURE

A flexibly positioned power drive unit ("PDU") system may comprise a flexibly positioned PDU comprising a PDU hinged portion and a track coupled to the flexibly positioned PDU, wherein the flexibly positioned PDU is configured to move along a cargo deck via the track and the PDU hinged portion is configured to move a cargo unit from a first location to a second location.

In various embodiments, the flexibly positioned PDU system may further comprise a first contact coupled to a first contact strip and a second contact coupled to a second contact strip. The flexibly positioned PDU system may further comprise a PDU track casing coupled to the cargo deck, wherein the flexibly positioned PDU is configured to travel within the PDU track casing. The flexibly positioned PDU system may further comprise a first barrier configured to cover the first contact and the first contact strip and a second barrier configured to cover the second contact and the second contact strip. The PDU hinged portion may be configured to extend from a PDU body via an electrically powered actuator or a spring loaded mechanism. The flexibly positioned PDU system may further comprise a drive wheel coupled to the PDU hinged portion and configured to contact the cargo unit. The flexibly positioned PDU may be configured to transport the cargo unit from the first location to the second location via rotation of the drive wheel. The flexibly positioned PDU may be configured to transport the cargo unit from the first location to the second location by moving the flexibly positioned PDU from the first location to the second location. The flexibly positioned PDU may be configured to receive instructions from a control module via a network.

A flexibly positioned PDU may comprise a PDU body and a PDU hinged portion configured to extend from the PDU body, wherein the flexibly positioned PDU is configured to move along a cargo deck and move a cargo unit from a first location to a second location.

In various embodiments, the flexibly positioned PDU may further comprise a first contact coupled to a first contact strip and a second contact coupled to a second contact strip, the first contact strip and second contact strip configured to provide power to the flexibly positioned PDU through the first contact and the second contact, respectively. The flexibly positioned PDU may further comprise at least one drive wheel coupled to the PDU hinged portion and at least one contact wheel coupled to the PDU body. The PDU hinged portion may be configured to extend through an opening in a PDU track casing. The PDU hinged portion may be configured to extend through the opening in the PDU track casing via an electrically powered actuator or a spring loaded mechanism. The flexibly positioned PDU may be configured to move the cargo unit from the first location to the second location by moving from the first location to the second location. The flexibly positioned PDU may be configured to move the cargo unit from the first location to the second location by fixing a location of the flexibly positioned PDU and by rotating at least one drive wheel coupled to the PDU hinged portion. The flexibly positioned PDU may further comprise at least one cog wheel coupled to the PDU body. The at least one cog wheel may be configured to be coupled to a track and rotate relative to the PDU body, thereby moving the flexibly positioned PDU.

A method of manufacturing a flexibly positioned power drive unit ("PDU") system may comprise inserting a flexibly positioned PDU into a PDU track casing on a cargo deck, coupling at least one cog wheel of the flexibly positioned PDU to a track in the PDU track casing, and coupling a first contact of the flexibly positioned PDU to a first contact strip and coupling a second contact of the flexibly positioned PDU to a second contact strip.

In various embodiments, the method may further comprise coupling at least one contact wheel of the flexibly positioned PDU to an under side of the PDU track casing, and providing an opening in the PDU track casing such that a PDU hinged portion may extend through the opening of the PDU track casing.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with aircraft cargo handling systems. However, various aspects of the disclosed embodiments may be adapted for performance in a variety of other systems such as ground cargo handling systems. As such, numerous applications of the present disclosure may be realized.

As used herein, "aft" refers to the direction associated with the tail of an aircraft, or generally, to the direction of exhaust of the gas turbine. As used herein, "forward" refers to the direction associated with the nose of an aircraft, or generally, to the direction of flight or motion.

Aircraft cargo handling systems as disclosed herein contain one or more flexibly positioned electromechanical actuators, otherwise known as power drive units or PDUs, configured to assist in the movement of a cargo unit throughout a cargo deck of an aircraft. Such flexibly positioned PDUs may be able to translate along the cargo deck floor to more efficiently position themselves for various sizes, shapes, and configurations of cargo units, or travel with one or more cargo units as the cargo units are being moved from a first location on the cargo deck to a second location on the cargo deck. In various embodiments disclosed herein, the flexibly positioned PDUs may be configured to be fixed in a selected location and move a cargo unit using one or more rotating elements coupled to the flexibly positioned PDUs. The flexibly positioned PDUs may also be configured to move with the cargo units such that the flexibly positioned PDUs translate along the cargo deck floor with the cargo units. In this way, flexibly positioned PDUs as disclosed herein may be configured to move cargo units with or without moving with the cargo units. As such, the aircraft cargo handling systems comprising one or more flexibly positioned PDUs as discussed herein may improve efficiency of an aircraft cargo loading or unloading process.

Figure 1:
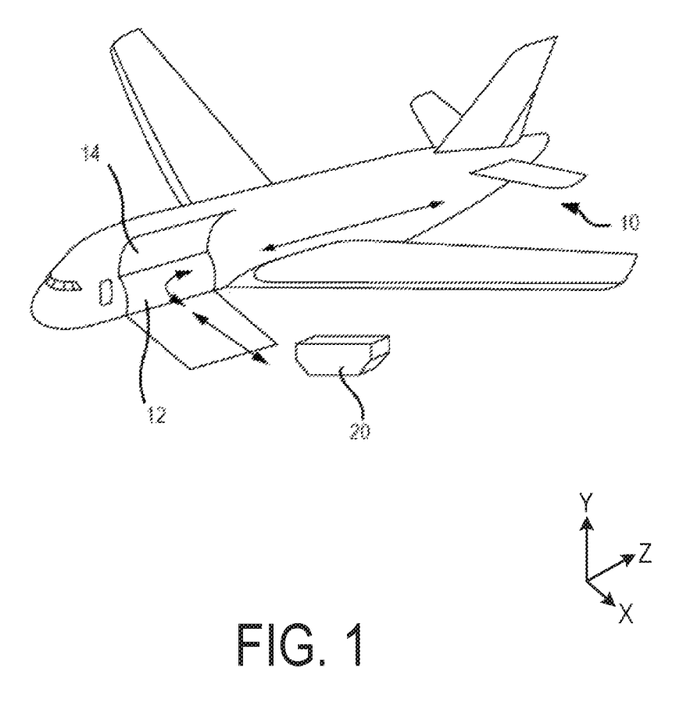
FIG. 1 illustrates a schematic view of an aircraft being loaded with a cargo unit, in accordance with various embodiments.

In various embodiments, and with reference to FIG. 1, a schematic view of an aircraft 10 having a cargo deck 12 is illustrated. Aircraft 10 may comprise a cargo load door 14, for example, at a side of the fuselage structure of aircraft 10, at an aft end of the fuselage structure, and/or at any other suitable location. Cargo unit 20 may be loaded through cargo load door 14 and onto cargo deck 12 of aircraft 10 or unloaded from cargo deck 12 of aircraft 10. Although cargo unit 20 is illustrated as a cargo container, cargo unit 20 could also be a pallet, an irregularly shaped object, an irregularly shaped container, or other cargo.

Items to be shipped by air, freight, and/or the like are typically loaded first onto specially configured pallets or into specially configured containers. In aviation, those various pallets and/or containers commonly are referred to as unit load devices (ULD's). ULD's are available in various sizes and capacities, and are typically standardized in dimension and shape. Accordingly, as referred to herein, cargo unit 20 may refer to a ULD. Once loaded with cargo items, cargo unit 20 is transferred to aircraft 10, and is loaded onto aircraft 10 through cargo load door 14 using a conveyor ramp, scissor lift, or the like. Once inside aircraft 10, cargo unit 20 is moved within cargo deck 12 to its final stowage position, as discussed further herein. Multiple cargo units may be brought on-board aircraft 10, during one or more loading procedures (e.g., at separate destinations), with each cargo unit 20 being placed in its respective stowage and transportation position in cargo deck 12. After aircraft 10 has reached its destination, one or more cargo units may be unloaded from aircraft 10 similarly, but in reverse sequence to the loading procedure.

Figure 2:
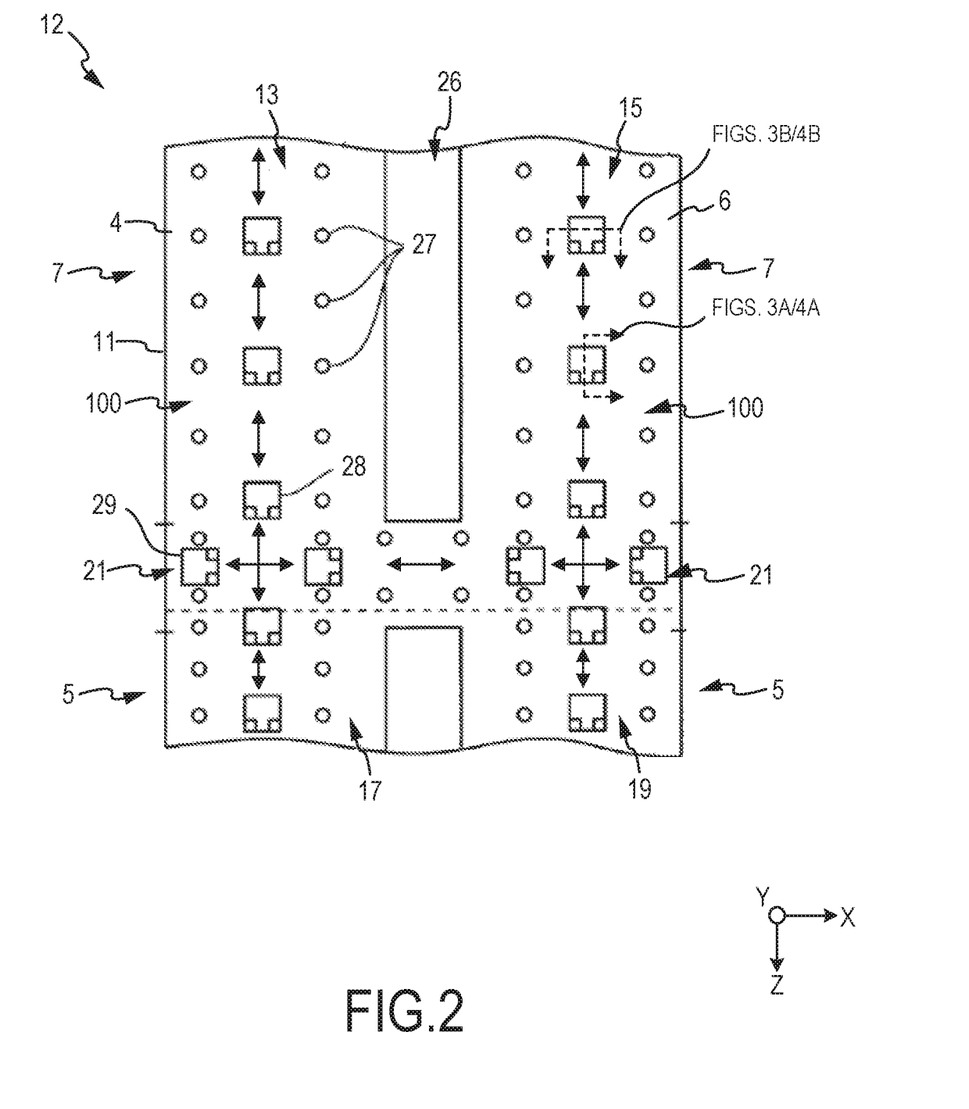
FIG. 2 illustrates a top view of a cargo deck comprising a plurality of flexibly positioned electromechanical actuators, in accordance with various embodiments.

In various embodiments, and with reference to FIG. 2 and continued reference to FIG. 1, cargo deck 12 is illustrated in greater detail. A generally H-shaped conveyance surface 26 comprising one of a metallic or composite material may form cargo deck 12, adjacent to cargo load door 14. However, there are many other aircraft cargo deck configurations to which the embodiments of the disclosure can be implemented. For example, various aircraft, particularly those designed primarily for the transportation of cargo without passengers, may have the upper passenger deck removed and an additional larger cargo deck installed. Other aircraft may have three or more parallel longitudinal tracks rather than the H-shape depicted in FIG. 2.

The cargo compartment may be defined by an inner wall of aircraft 10 (e.g., an aircraft envelope 11), and may include a cargo handling system comprising a plurality of freely rotating conveyance rollers 27 mounted in cargo deck 12 to define a conveyance plane. Cargo unit 20 loaded onto cargo deck 12 can be moved manually throughout the cargo bay upon conveyance rollers 27. However, it may be desirable to electromechanically propel cargo unit 20 with minimal or no manual assistance. In that regard, the H-shaped conveyance surface 26 may include a number of power drive units (PDU's) 28 and 29 that provide a mechanism upon which cargo unit 20 is propelled over conveyance rollers 27. Each PDU 28 and 29 typically includes a drive roller element which can be raised from a lowered position beneath cargo deck 12 to an elevated position. These PDU's are referred to as "self-lift" PDU's. In the elevated position, the drive roller element contacts and drives the overlying cargo that rides on conveyance rollers 27. Other types of PDU's, which can also be used as embodiments of the present disclosure, are above the conveyor plane all the time and held up by a spring. These PDU's may be referred to as "spring-lift" PDU's.

In the longitudinal direction, conveyance surface 26 may include a left track 4 and a right track 6 along which cargo unit 20 is to be stowed in parallel columns during flight. In the transverse direction, cargo deck 12 may also be logically separated into a tail (or "aft") section 5 and a forward section 7. Thus, the left and right tracks 4, 6 may be divided into four sections, two forward sections (e.g., a left forward section 13 and a right forward section 15) and two aft sections (e.g., a left aft section 17 and a right aft section 19). In addition to the four sections, there may be an additional path 21 between both tracks 4, 6 proximate cargo load door 14. This additional path 21 divides the cargo bay between forward section 7 and aft section 5. Additional path 21 is used to move cargo unit 20 into and out the aircraft 10, and also to transfer cargo unit 20 between the left track 4 and right track 6.

In typical cargo handling systems, one or more PDUs may be embedded in the cargo deck such that the PDUs are positioned in fixed locations throughout the cargo deck. However, such fixed positioned PDUs may not be suitable for various shapes, sizes, and configurations of cargo units and may cause problems with the loading procedure if one or more of the PDUs fail. For example, in certain situations, a given cargo unit may be too small such that, at times, the cargo unit may be positioned between two PDUs without contacting one of the PDUs. In a situation such as this, the cargo unit will not be electromechanically powered along the cargo deck and human assistance may be used to move the cargo unit towards the target location. Similarly, in other situations, PDUs may be at fixed positions that are too close together. In these situations, the PDUs may be sufficient to move various sizes and configurations of cargo units along the cargo deck, however, these systems may comprise an excessive number of PDUs and be more expensive to manufacture and/or operate and add unwanted excess weight to the aircraft.

Accordingly, in various embodiments, cargo deck 12 may comprise one or more flexibly positioned PDUs positioned along cargo deck 12. Still referring to FIG. 2, cargo deck may comprise a first flexibly positioned PDU 28 and a second flexibly positioned PDU 29. First flexibly positioned PDU 28 and second flexibly positioned PDU 29 may be configured to move along cargo deck 12 such that the PDUs may adapt to a given size, shape, and/or configuration of cargo unit and/or be configured to move along cargo deck 12 with a cargo unit to the cargo unit's target location. For example, left forward section 13, right forward section 15, left aft section 17, and right aft section 19 may comprise plurality of first flexibly positioned PDUs 28. First flexibly positioned PDUs 28 may be configured to move in the forward and aft directions (or along the Z-axis) in response to instructions provided via a human operator through a control module or, in various embodiments, may be configured to move autonomously to a desired location. For example, in various embodiments, first flexibly positioned PDUs 28 may be configured to communicate with each other and/or a control module via a network to organize themselves in desired locations depending on the size, shape, and configuration of cargo unit 20 or required movement throughout cargo deck 12. In various embodiments, first flexibly positioned PDUs 28 move both in the forward and aft direction.

Likewise, a plurality of second flexibly positioned PDUs 29 may be positioned orthogonally to first flexibly positioned PDUs 28. Second flexibly positioned PDUs 29 may be configured to move horizontally along cargo deck 12 (or along the X-axis) in response to instructions provided via a human operator through a control module or, in various embodiments, may be configured to move autonomously to a desired location. For example, in various embodiments, second flexibly positioned PDUs 29 may be configured to communicate with each other and/or a control module via a network to organize themselves in a preferred position depending on the size, shape, and/or configuration of cargo unit 20 or required movement throughout cargo deck 12. Second flexibly positioned PDUs may be configured to move in both horizontal directions (i.e., positive and negative X-directions). Accordingly, in various embodiments, cargo deck 12 comprising first flexibly positioned PDUs 28 and second flexibly positioned PDUs 29 may assist in movement of a cargo unit in the forward and aft directions as well as either horizontal direction.

In various embodiments, first flexibly positioned PDU 28, second flexibly positioned PDU 29, and/or cargo deck 12 may comprise one or more sensors configured to provide positioning data regarding first flexibly positioned PDU 28 and second flexibly positioned PDU 29. First flexibly positioned PDU 28, second flexibly positioned PDU 29, and or cargo deck 12 may comprise a camera, a structured light sensor, a light detection and ranging (LiDAR) sensor, an infrared sensor, a depth sensor (e.g., an IR projector/camera assembly such as a MICROSOFT® Kinect®, an ASUS® Xtion PRO®, etc.), a 3D scanner/camera, an ultrasound range finder, a radar sensor, and/or any other suitable sensing device. For example, in various embodiments, first flexibly positioned PDU 28 and second flexibly positioned PDU 29 may comprise one or more sensors coupled directly to a forward surface, aft surface, bottom surface, top surface, or side surface configured to provide positioning data to the control module or to other PDUs over the network. In various embodiments, one or more sensors may be positioned along cargo deck 12 such that sensors may be configured to monitor and communicate positioning data regarding multiple PDUs.

Figure 3A:
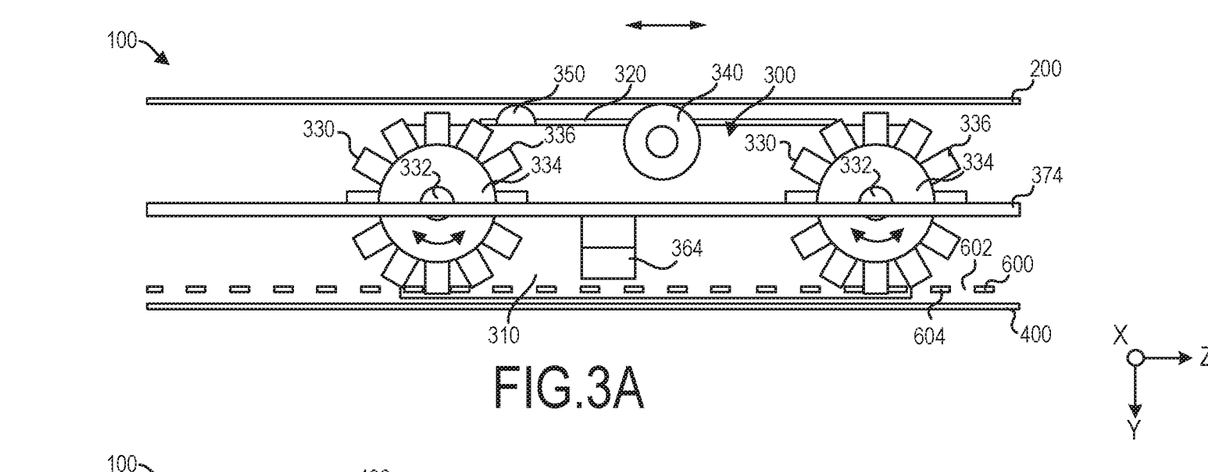
FIGS. 3A and 3B illustrate cross-sectional views from the side and rear of a flexibly positioned PDU system, respectively, in accordance with various embodiments.
Figure 3B:
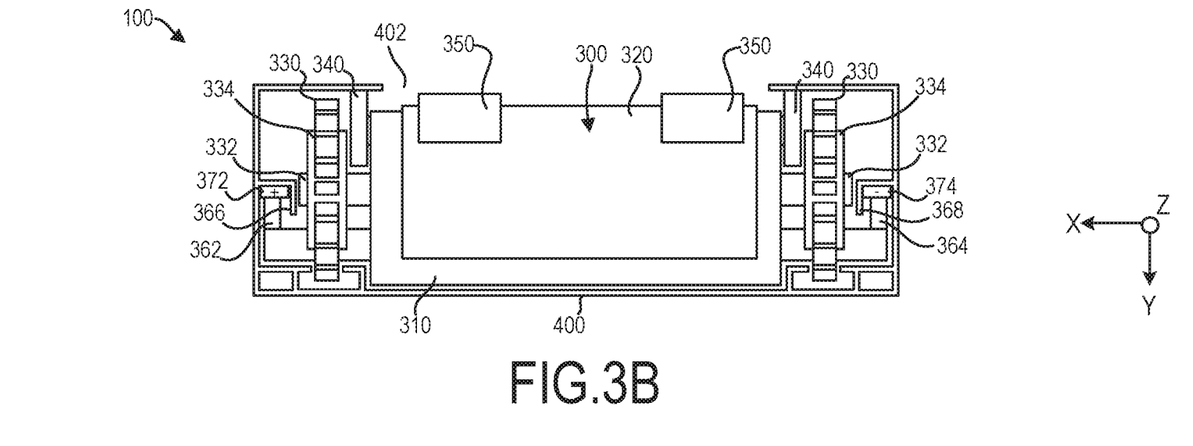

With reference to FIGS. 3A and 3B, cross-sectional views from the side and rear of a flexibly positioned PDU system 100 is illustrated, respectively, in accordance with various embodiments. Flexibly positioned PDU system 100 may comprise a cargo deck 200, flexibly positioned PDU 300, a PDU track casing 400, a first contact strip 372, a second contact strip 374 opposite first contact strip 372, and a track 600. Together, cargo deck 200, flexibly positioned PDU 300, first contact strip 372, second contact strip 374, and track 600 may be configured to move flexibly positioned PDU 300 along cargo deck 200 such that flexibly positioned PDU 300 may be configured to efficiently transport cargo units of various shapes, sizes, and configurations.

Flexibly positioned PDU 300 may comprise a PDU body 310, a PDU hinged portion 320 coupled to PDU body 310, one or more cog wheels 330 coupled to PDU body 310, one or more contact wheels 340 coupled to PDU body 310, one or more drive wheels 350 coupled to PDU hinged portion 320, a first contact 362, and a second contact 364. In various embodiments, flexibly positioned PDU 300 may comprise any number of cog wheels 330, contact wheels 340, and/or drive wheels 350. Cog wheels 330 may be positioned on one more axles 332 extending through one or more apertures in PDU body 310 and be configured to rotate relative to PDU body 310. Cog wheel 330 may comprise a root 334 comprising one or more teeth 336 extending radially outward from root 334 and be configured to contact track 600. For example, in various embodiments, track 600 may comprise one or more grooves 602 alternating with one or more treads 604. In various embodiments, as cog wheel 330 rotates via axle 332, teeth 336 may be inserted into grooves 602 of track 600 and use treads 604 as traction for rotating cog wheel 330. Cog wheel 330 may be configured to rotate in a clockwise or counterclockwise direction (about the X-axis), thereby moving flexibly positioned PDU 300 in either direction along the Z-axis. While illustrated herein as comprising rectangular teeth 336 and a slotted track 600, cog wheel 330 and track 600 are not limited in this regard and may comprise any suitable cog wheel and track mechanism. For example, in various embodiments, cog wheel 330 and track 600 may comprise an involute gear system configured to reduce wear between cog wheel 330 and track 600.

In various embodiments, first contact 362 may be configured to contact a first contact strip 372 and second contact 364 may be configured to contact a second contact strip 374 in order to power cog wheels 330, PDU hinged portion 320, and/or drive wheels 350. First contact strip 372 and second contact strip 374 may extend through and beneath cargo deck 200 along a path of flexibly positioned PDU 300. For example, in various embodiments, first contact strip 372 may be positively charged and second contact strip 374 may be negatively charged. Together, first contact 362, second contact 364, first contact strip 372, and second contact strip 374 may form a closed circuit such that power may be provided from first contact strip 372 and second contact strip 374 to flexibly positioned PDU 300. In various embodiments, first contact 362 and second contact 364 may be spring-loaded such that first contact 362 remains in contact with first contact strip 372 and second contact 364 remains in contact with second contact strip 374. First contact strip 372 and first contact 362 may be positioned on an opposite side of flexibly positioned PDU 300 as second contact strip 374 and second contact 364.

In various embodiments, first contact strip 372 and first contact 362 may be covered by a first barrier 366 and second contact strip 374 and second contact 364 may be covered by a second barrier 368. First barrier 366 and second barrier 368 may be configured to prevent electrocution of a human operator contacting flexibly positioned PDU 300 and prevent flexibly positioned PDU 300 from failing via a short circuit from contact between first contact strip 372 and second contact strip 374. In various embodiments, first contact strip 372 and second contact strip 374 may provide power configured to drive cog wheel(s) 330, drive drive wheel(s) 350, and/or activate and deactivate PDU hinged portion 320.

In various embodiments, flexibly positioned PDU 300 may be enclosed in PDU track casing 400. PDU track casing 400 may form one portion of cargo deck 200 and may be flush with cargo deck 200. In various embodiments, PDU track casing 400 may be situated such that PDU track casing 400 is partially below cargo deck 200 such that at least a portion of PDU track casing is above of cargo deck 200. In various embodiments, PDU track casing 400 may be bolted to cargo deck 200 such that a bottom surface of PDU track casing 400 contacts a top surface of cargo deck 200. PDU track casing 400 may define the area in which flexibly positioned PDU 300 may move along cargo deck 200, while a remainder of cargo deck 200 may contain a plurality of conveyance rollers which may define a plane in which a cargo unit may move over.

Flexibly positioned PDU 300 may comprise one or more contact wheels 340. Contact wheels 340 may be spring loaded and configured to contact a bottom surface of PDU track casing 400. In such a way, contact wheels 340 may be configured to provide a downward (in the Y-direction) force to flexibly positioned PDU 300 such that cog wheels 330 may stay engaged with track 600 as flexibly positioned PDU 300 moves along cargo deck 200.

PDU track casing 400 may comprise an opening 402 in which PDU hinged portion 320 of flexibly positioned PDU 300 may extend through in an activated state. For example, with reference to FIGS. 3A and 3B, flexibly positioned PDU 300 is illustrated in a deactivated state. In a deactivated state, an entirety of flexibly positioned PDU 300 may be positioned below a plane defined by a plurality of conveyance rollers. Flexibly positioned PDU 300 may move to a desired location corresponding to a first location of a cargo unit or to align with a preferred position based on a cargo unit size or configuration based on instructions from a control module or through data acquired through one or more sensors.

Figure 4A:
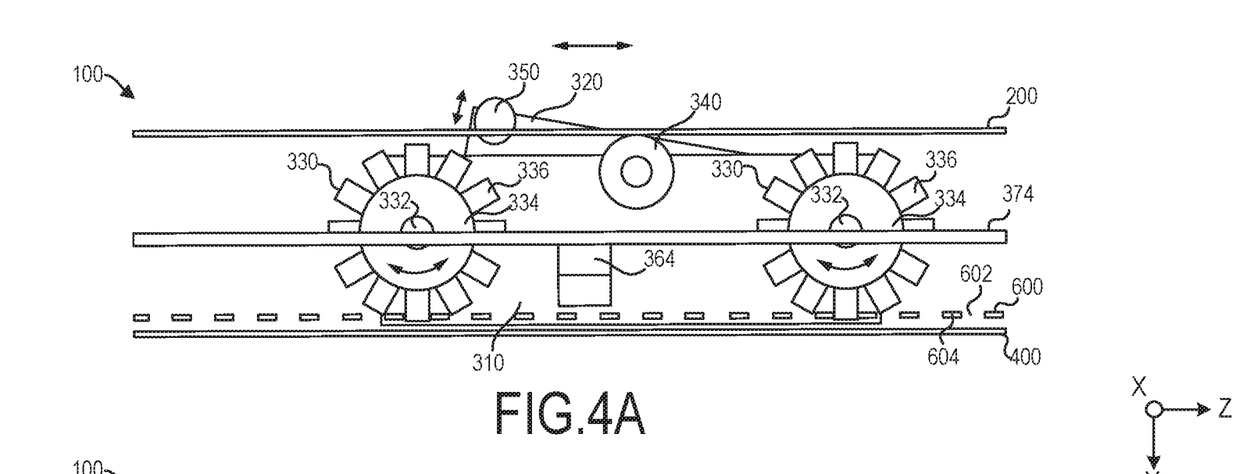
FIGS. 4A and 4B illustrate cross-sectional views from the side and rear of a flexibly positioned PDU system, respectively, in accordance with various embodiments.
Figure 4B:
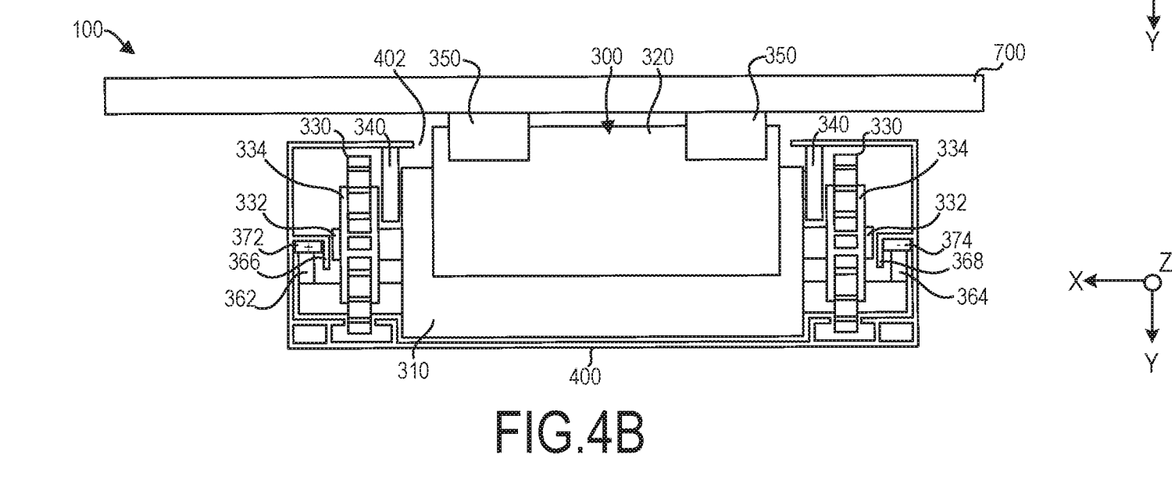

In various embodiments, upon reaching the first location, one or more flexibly positioned PDUs 300 may activate PDU hinged portion 320. With reference, to FIGS. 4A and 4B, in an activated state, PDU hinged portion 320 may extend through opening 402 of PDU track casing 400 and contact a bottom of a cargo unit 700 via drive wheel(s) 350. In the activated state, PDU hinged portion may extend to an elevation even with or above the plane defined by the plurality of conveyance rollers. In various embodiments, PDU hinged portion 320 may be activated via an electrically powered actuator or via spring loaded mechanism. Drive wheel(s) 350 may comprise a material that has a high coefficient of friction when considered with a material of the cargo unit 20 such as rubber, silicone, and synthetic rubbers. For example, in various embodiments, drive wheels 350 may comprise a material with a coefficient of friction between 0.4 and 0.9. In various embodiments, flexibly positioned PDU(s) 300 may anchor itself/themselves in the desired location by locking cog wheel(s) 330 in track 600. Drive wheel(s) 350 may be powered such that drive wheel(s) 350 may rotate and move cargo unit 700 along cargo deck 200 to a second location.

In various embodiments, one or more flexibly positioned PDUs 300 may be configured to move with cargo unit 700. For example, in various embodiments, flexibly positioned PDU 300 may move to a first location such as a location underneath cargo unit 700. Flexibly positioned PDU 300 may be activated and PDU hinged portion 320 may be raised through opening 402. PDU hinged portion 320 may contact cargo unit 700 through drive wheel(s) 350 and lift cargo unit 700. Drive wheel(s) 350 may be locked such that drive wheel(s) 350 do not rotate. Flexibly positioned PDU 300 may then move to a second location via rotation of cog wheel(s) 330 along track 600. Accordingly, in various embodiments, flexibly positioned PDU 300 may be configured to be anchored in a given location and move cargo unit 700 via rotation of drive wheel(s) 350 or be configured to move cargo unit 700 to a second location via movement of the entire flexibly positioned PDU 300.

Figure 5:
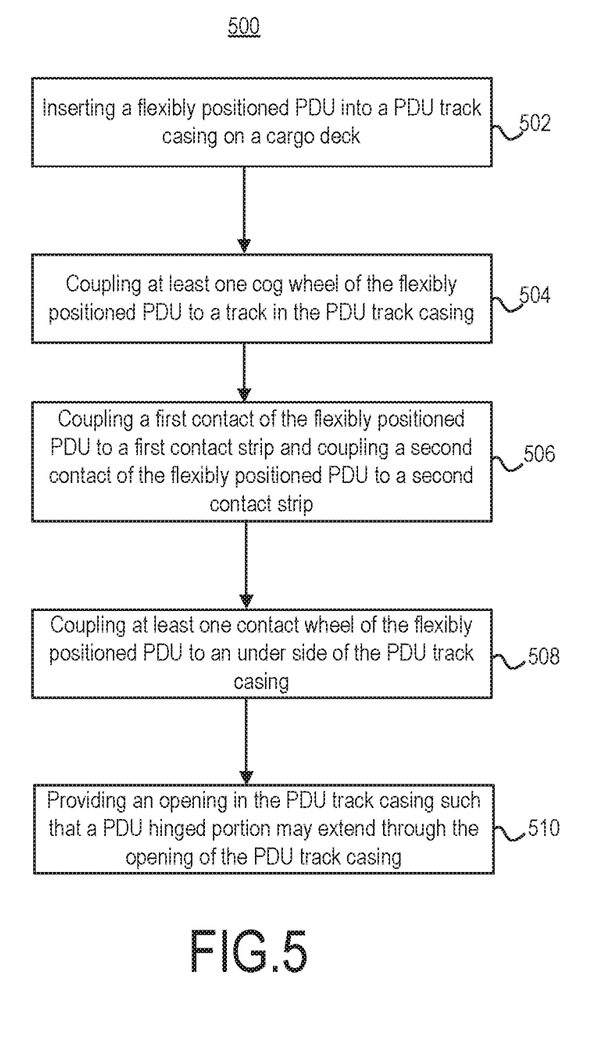
FIG. 5 illustrates a method of manufacturing a flexibly positioned PDU system, in accordance with various embodiments.

A block diagram illustrating a method of manufacturing a flexibly positioned PDU system is illustrated in FIG. 5, in accordance with various embodiments. In various embodiments, the method may comprise inserting a flexibly positioned PDU into a PDU track casing on a cargo deck (Step 502). The method may further comprise coupling at least one cog wheel of the flexibly positioned PDU to a track in the PDU track casing (Step 504). The method may further comprise coupling a first contact of the flexibly positioned PDU to a first contact strip and coupling a second contact of the flexibily positioned PDU to a second contact strip (Step 506). The method may further comprise coupling at least one contact wheel of the flexibly positioned PDU to an underside of the PDU track casing (Step 508). The method may further comprise providing an opening in the PDU track casing such that a PDU hinged portion may extend through the opening of the PDU track casing (Step 510).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Methods and systems are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A flexibly positioned power drive unit ("PDU") system, comprising:
   a flexibly positioned PDU comprising a PDU hinged portion:
   a track coupled to the flexibly positioned PDU, wherein the flexibly positioned PDU is configured to move along a cargo deck via the track and the PDU hinged portion is configured to move a cargo unit from a first location to a second location, and
   a drive wheel coupled to the PDU hinged portion and configured to contact the cargo unit.

2. The flexibly positioned PDU system of claim 1, further comprising a first contact coupled to a first contact strip and a second contact coupled to a second contact strip.

3. The flexibly positioned PDU system of claim 2, further comprising a PDU track casing coupled to the cargo deck, wherein the flexibly positioned PDU is configured to travel within the PDU track casing.

4. The flexibly positioned PDU system of claim 3, further comprising a first barrier configured to cover the first contact and the first contact strip and a second barrier configured to cover the second contact and the second contact strip.

5. The flexibly positioned PDU system of claim 1, wherein the PDU hinged portion is configured to extend from a PDU body via an electrically powered actuator or a spring loaded mechanism.

6. The flexibly positioned PDU system of claim 1, wherein the flexibly positioned PDU is configured to transport the cargo unit from the first location to the second location via rotation of the drive wheel.

7. The flexibly positioned PDU system of claim 1, wherein the flexibly positioned PDU is configured to transport the cargo unit from the first location to the second location by moving the flexibly positioned PDU from the first location to the second location.

8. The flexibly positioned PDU system of claim 1, wherein the flexibly positioned PDU is configured to receive instructions from a control module via a network.

9. A flexibly positioned power drive unit ("PDU"), comprising: a PDU body; a PDU hinged portion configured to extend from the PDU body, wherein the flexibly positioned PDU is configured to move along a cargo deck and move a cargo unit from a first location to a second location; and
   a drive wheel coupled to the PDU hinged portion and configured to contact the cargo unit.

10. The flexibly positioned PDU of claim 9, further comprising a first contact coupled to a first contact strip and a second contact coupled to a second contact strip, the first contact strip and second contact strip configured to provide power to the flexibly positioned PDU through the first contact and the second contact, respectively.

11. The flexibly positioned PDU of claim 9, wherein the PDU hinged portion is configured to extend through an opening in a PDU track casing.

12. The flexibly positioned PDU of claim 11, wherein the PDU hinged portion is configured to extend through the opening in the PDU track casing via an electrically powered actuator or a spring loaded mechanism.

13. The flexibly positioned PDU of claim 9, wherein the flexibly positioned PDU is configured to move the cargo unit from the first location to the second location by moving from the first location to the second location.

14. The flexibly positioned PDU of claim 9, wherein the flexibly positioned PDU is configured to move the cargo unit from the first location to the second location by fixing a location of the flexibly positioned PDU and by rotating at least one drive wheel coupled to the PDU hinged portion.

15. The flexibly positioned PDU of claim 9, wherein the flexibly positioned PDU further comprises at least one cog wheel coupled to the PDU body.

16. The flexibly positioned PDU of claim 15, wherein the at least one cog wheel is configured to be coupled to a track and rotate relative to the PDU body, thereby moving the flexibly positioned PDU.

17. A method of manufacturing a flexibly positioned power drive unit ("PDU") system, the method comprising:
   inserting a flexibly positioned PDU into a PDU track casing on a cargo deck;
   coupling at least one cog wheel of the flexibly positioned PDU to a track in the PDU track casing; and
   coupling a first contact of the flexibly positioned PDU to a first contact strip and coupling a second contact of the flexibly positioned PDU to a second contact strip.

18. The method of manufacturing of claim 17, the method further comprising:

coupling at least one contact wheel of the flexibly positioned PDU to an under side of the PDU track casing; and providing an opening in the PDU track casing such that a PDU hinged portion may extend through the opening of the PDU track casing.

* * * * *